Aug. 15, 1950     E. C. C. MILLER     2,519,147
SWIVEL JOINT
Filed March 14, 1947
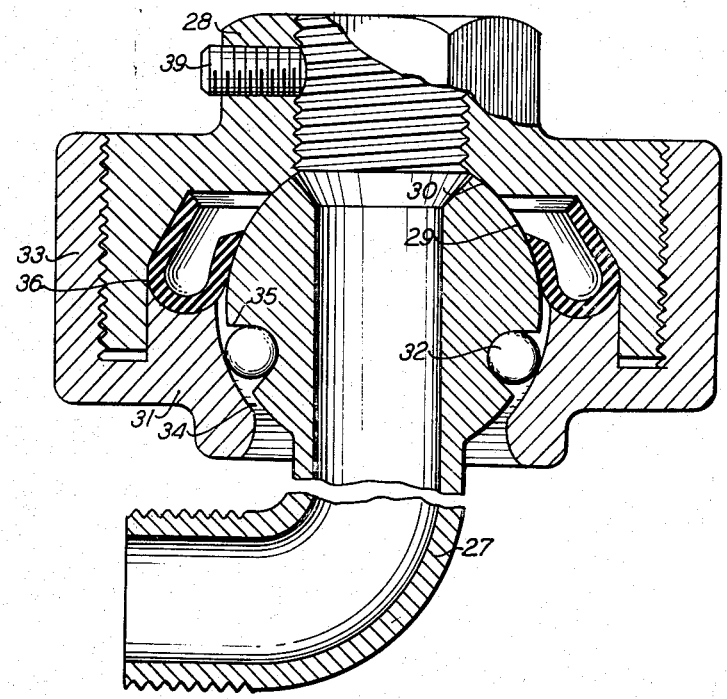
INVENTOR.
ERNEST C. C. MILLER
BY
George H. Mitchell, Jr.

Patented Aug. 15, 1950

2,519,147

UNITED STATES PATENT OFFICE 2,519,147

SWIVEL JOINT

Ernest C. C. Miller, Laurelton, N. Y.

Application March 14, 1947, Serial No. 734,787

2 Claims. (Cl. 285—97.3)

My invention relates to couplings for fluid-conducting members such as pipes and hoses.

It is an object of my invention to provide an improved pipe or hose coupling wherein substantial rotational freedom is permitted between the pipe or hose elements connected by the device.

It is another object to provide a coupling device of the character indicated wherein greatest rotational freedom is permitted even for high pressure differentials between the inside and the outside of the coupling device.

It is still another object to provide a device of the character indicated wherein both rotational and axial play are permitted to the adjacent coupled pipe or hose elements.

Other objects and various further features of the invention will be pointed out or will occur to those skilled in the art from a reading of the following specification in conjunction with the accompanying drawings. In said drawings the figure is a vertical sectional view of a coupling device incorporating features of the invention.

Briefly stated, my invention contemplates a coupling device comprising first and second pipe members to be permitted rotational freedom with respect to each other. Thrust-receiving antifriction bearing means provide the rotational freedom, and a novel method of sealing permits the coupling to sustain high-pressure loads while still permitting the rotational freedom. In the specific form to be described, the above features are incorporated into a coupling to sustain high internal pressures and permitting both rotational and axial freedom to the pipe or hose members to be joined.

In the form of the invention shown in the figure both rotational and axial play are permitted adjacent pipes or hoses which may be subjected to high internal pressures. The coupling may comprise a first pipe element 27 and a second pipe element 28. To produce axial freedom, one pipe element (27) is formed at one end with a bulbous exterior having a generally spherical surface 29. Slidingly to receive this surface 29, the pipe fitting 28 may be internally formed with a second cylindrical surface 30. The pipe fitting 28 supports a radially inwardly extending flange 31, and antifriction bearing elements such as balls 32 provide relatively friction-free engagement between the flange 31 and the bulbous fitting 27. In the form shown, flange 31 forms a part of a sleeve member 33 threadingly carried by the pipe fitting 28, and the internal surface 34 of flange 31 is generally spherical, preferably about the same center as that for spherical surface 29.

The antifriction bearing means 32 may be retained in a recess or raceway near the surface 34 or near the surface 29; in the form shown, these elements 32 are confined by a circumferentially extending groove 35 formed in the bulbous end of pipe fitting 27. I prefer that the groove 35 be formed remote from the bulbous end of pipe fitting 27 by an amount exceeding the radius of the spherical surface 29.

In order to provide a seal a member 36 of sealing material may overlap parts of the spherical surface 29 and of an adjacent annular surface on the flange 31. I prefer that the projection of said annular surface be substantially tangent to or flush with the spherical surface 29. In the form shown, the annular seal surface on flange 31 is generally toroidally formed and continuous with a seal-seating surface on the pipe fitting 28. The seal member 36 may, therefore, resemble an annular cup. It will be understood that, with the application of high internal pressures to the coupling, static pressures in the annular cup 36 will deflect the walls thereof into sealing contact with the surface 29, the flange 31, and the pipe fitting 28. At the same time these pressures will serve to relieve frictional bind between the spherical surfaces 29—30 and to transfer substantially all axial thrust or load to the antifriction bearing elements 32. Under the circumstances, it will be understood that rotational freedom and freedom for axial misalignment are both permitted to pipe members 27—28.

It will be seen that I have described a relatively simple pipe coupling for a variety of applications and that, regardless of the application of this fitting, there may be permitted a maximum of the desired freedom of movement between pipes or hoses to be joined. The two pipe members of the coupling according to the invention may be appropriately formed, as need be, at their outer ends. In the form shown, for example, the sleeve member 33 may be slipped over the male end-fitting of pipe member 27; the other pipe fittings of this coupling are shown to include a female connection on which external flats have been provided for tightening purposes. If desired, the female end of pipe member 28 may also carry set screw 39 for securing any given adjustment to a pipe, as will be clear.

While I have described my invention in detail for the preferred form shown, it will be understood that modifications may be made within the

I claim:

1. In a device of the character indicated, a first pipe fitting including an enlarged generally spherical surface at the end thereof, a second pipe fitting having an internally spherical surface slidingly to abut parts of said first spherical surface, a sleeve threadedly engaging said second pipe fitting and including an internal spherical surface in circumferential proximity to parts of said first spherical surface, said sleeve also being provided with an annularly extending inner surface resembling a portion of a toroid, said toroidal surface and said spherical surface of the said sleeve intersecting along an annular edge in proximity to said first-mentioned spherical surface, a raceway disposed in one of said elements, antifriction bearing elements in said raceway, and an annular ring of sealing material engaging said toroidal surface and adjacent portions of said first-mentioned spherical surface.

2. In a device of the character indicated, a first pipe fitting including an enlarged generally spherical surface at the end thereof, circumferentially extending raceway means provided in said enlarged end, a second pipe fitting having an internally spherical surface slidingly to abut parts of said first-mentioned spherical surface, a sleeve threadedly engaging said second pipe fitting and including an internal spherical surface in circumferential proximity to said raceway means, antifriction bearing elements in said raceway means and in engagement with said last-mentioned spherical surface, said sleeve including an annularly extending inner surface resembling a portion of a toroid disposed so as to intersect said spherical surface on the sleeve so as to provide an annular edge in proximity to said first-mentioned spherical surface, and an annular ring of sealing material overlying a portion of said toroidal surface and adjacent portions of said first-mentioned spherical surface.

ERNEST C. C. MILLER.

REFERENCES CITED

The following references are of record in the file of this patent:

UNITED STATES PATENTS

| Number | Name | Date |
|---|---|---|
| 199,936 | Rowland | Feb. 5, 1878 |
| 1,012,398 | McCombie | Dec. 19, 1911 |
| 1,912,494 | Patterson | June 6, 1933 |
| 1,963,112 | Baker | June 19, 1934 |
| 2,089,439 | Silberstein | Aug. 10, 1937 |
| 2,126,505 | Risser | Aug. 9, 1938 |
| 2,278,720 | Follet | Aug. 7, 1942 |

FOREIGN PATENTS

| Number | Country | Date |
|---|---|---|
| 485,885 | Great Britain | May 26, 1938 |